(12) United States Patent
Karani et al.

(10) Patent No.: US 10,567,505 B2
(45) Date of Patent: Feb. 18, 2020

(54) METHODS AND SYSTEMS FOR SESSION SYNCHRONIZATION AND SHARING OF APPLICATIONS BETWEEN DIFFERENT USER SYSTEMS OF A USER

(71) Applicant: salesforce.com, inc., San Francisco, CA (US)

(72) Inventors: Vijay Karani, Saratoga, CA (US); Kongposh Sapru, Redwood City, CA (US)

(73) Assignee: salesforce.com, inc., San Francisco, CA (US)

(*) Notice: Subject to any disclaimer, the term of this patent is extended or adjusted under 35 U.S.C. 154(b) by 137 days.

(21) Appl. No.: 15/874,044

(22) Filed: Jan. 18, 2018

(65) Prior Publication Data
US 2019/0222643 A1 Jul. 18, 2019

(51) Int. Cl.
H04L 29/08 (2006.01)
(52) U.S. Cl.
CPC ........ *H04L 67/1095* (2013.01); *H04L 67/141* (2013.01); *H04L 67/142* (2013.01)
(58) Field of Classification Search
CPC .. H04L 67/141; H04L 67/142; H04L 67/1095
See application file for complete search history.

(56) References Cited

U.S. PATENT DOCUMENTS

| | | | |
|---|---|---|---|
| 5,983,227 A | 11/1999 | Nazem et al. | |
| 6,216,133 B1 | 4/2001 | Masthoff | |
| 6,236,978 B1 | 5/2001 | Tuzhilin | |
| 6,288,717 B1 | 9/2001 | Dunkle | |
| 6,411,949 B1 | 6/2002 | Schaffer | |
| 6,907,566 B1 | 6/2005 | McElfresh et al. | |
| 7,062,502 B1 | 6/2006 | Kesler | |
| 7,100,111 B2 | 8/2006 | McElfresh et al. | |
| 7,269,590 B2 | 9/2007 | Hull et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |

(Continued)

OTHER PUBLICATIONS

Final Office Action for U.S. Appl. No. 12/437,418, dated Apr. 16, 2012.

(Continued)

*Primary Examiner* — Jason D Recek
(74) *Attorney, Agent, or Firm* — LKGlobal | Lorenz & Kopf, LLP

(57) ABSTRACT

Methods and systems are provided for implementing session synchronization to synchronize applications at different user systems (e.g., mobile device, laptop, desktop, tablet) of a particular user. As will be explained in greater detail below, this platform level solution that can maintain session information received any number of different user systems of the particular user and share this collective session information with each of the other user systems as session-synchronization information that can be used, at any user system of that user, to ensure that when that user switches from using one user system to another user system that that applications at the "new" user system being switched to are synchronized with any other applications that were most recently in use at all of the other user systems of that user.

20 Claims, 13 Drawing Sheets

(56) References Cited

U.S. PATENT DOCUMENTS

| | | |
|---|---|---|
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,644,122 B2 | 1/2010 | Weyer et al. |
| 7,668,861 B2 | 2/2010 | Steven |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,073,850 B1 | 12/2011 | Hubbard et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 9,736,246 B1* | 8/2017 | Armstrong ............ H04L 67/146 |
| 2003/0084165 A1* | 5/2003 | Kjellberg ................ H04L 63/08 709/227 |
| 2008/0010270 A1 | 1/2008 | Gross |
| 2008/0147487 A1 | 6/2008 | Hirshberg |
| 2008/0209320 A1 | 8/2008 | Mawhinney et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0258204 A1 | 10/2011 | Hubbard et al. |
| 2012/0290407 A1 | 11/2012 | Hubbard et al. |
| 2013/0254685 A1* | 9/2013 | Batraski ................ G06F 16/955 715/760 |
| 2017/0200007 A1* | 7/2017 | Drummond ........... G06F 21/575 |
| 2018/0004828 A1* | 1/2018 | Kathuria ................. H04L 67/26 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination-Wikipedia (http://en.wikipedia.org/wiki/Linear_Combination (accessed Jul. 16, 2012).

* cited by examiner

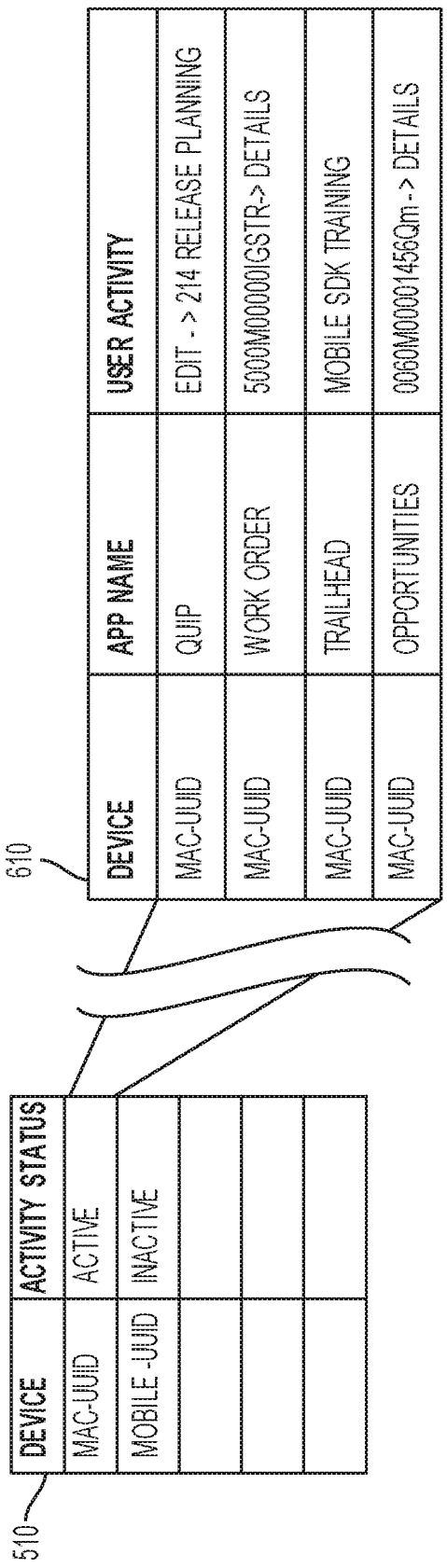

| DEVICE | APP NAME | APP LINK | USER ACTIVITY |
|---|---|---|---|
| MAC-UUID | WEB BROWSER OR QUIP APP IF AVAILABLE | https://salesforce.quip.com/yJmlAta6AYO2#EQ EACAQkztb | Edit_para3 |
| MAC-UUID | WEB BROWSER | https://org62.lightning.force.com/one/one.app#/s Object/5000M00000igstrQAA/view | 5000M00000igstr-> Details |
| MAC-UUID | WEB BROWSER / TRAILHEAD | https://trailhead.salesforce .com/en/modules/mobile _sdk_introduction/units/mo bilesdk_intro_scenarios | Intro_Scenarios_para2 |
| MAC-UUID | WEB BROWSER | https://org62.lightning.forc e.com/one/one.app#/sObj ect/0060M00001456QmQ AI/view | 0060M00001456QmQAI -> Details |

FIG. 7A

| DEVICE | APP NAME | APP LINK | USER ACTIVITY |
|---|---|---|---|
| MOBILE-UUID | QUIP | https://salesforce.quip.com/yJmiAta6AYO2 | Edit_Para3 |
| MOBILE-UUID | FIELD SERVICE | WO-> 5000M00000igstrQAA | 5000M00000igstrQAA -> Details |
| MOBILE-UUID | SALESFORCE / TRAILHEAD | Trailhead ->MobileSDK_intro_scenarios | Intro_scenarios_para2 |
| MOBILE-UUID | SALESFORCE | Opportunities -> 0060M0000l456Qm | 0060M0000l456Qm -> Details |

FIG. 7B

METHODS AND SYSTEMS FOR SESSION SYNCHRONIZATION AND SHARING OF APPLICATIONS BETWEEN DIFFERENT USER SYSTEMS OF A USER

TECHNICAL FIELD

Embodiments of the subject matter described herein relate generally to synchronization of applications. More particularly, embodiments of the subject matter relate to methods and systems for session synchronization and sharing of applications between different user systems of a particular user.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Many cloud-based applications are generated based on data that is accessed from storage, and then delivered to a user system such as a mobile device or desktop computer. It is desirable to speed up the process of accessing data that is needed by an application to improve performance and improve user experience with the application.

Many users today have multiple computing devices at their disposal. For instance, a particular user might have a mobile device, a smartphone, a laptop, a desktop, a tablet, etc. The particular user might use any one of these at any time depending on numerous factors such as where they are located, due to device characteristics like network connectivity and available battery power, and/or other factors such as convenience, awareness of other users, etc.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a table that illustrates a log of the user systems maintained by the session manager module in accordance with the disclosed embodiments.

FIG. 6 is another table that illustrates an activity log for one of the user systems from FIG. 5 that is maintained by the session manager module in accordance with the disclosed embodiments.

FIGS. 7A and 7B are a set of tables that illustrate how the activity log table of FIG. 6 is used for context mapping by the session manager module between different user systems when the currently active user system changes in accordance with the disclosed embodiments.

DETAILED DESCRIPTION

Figure 1:
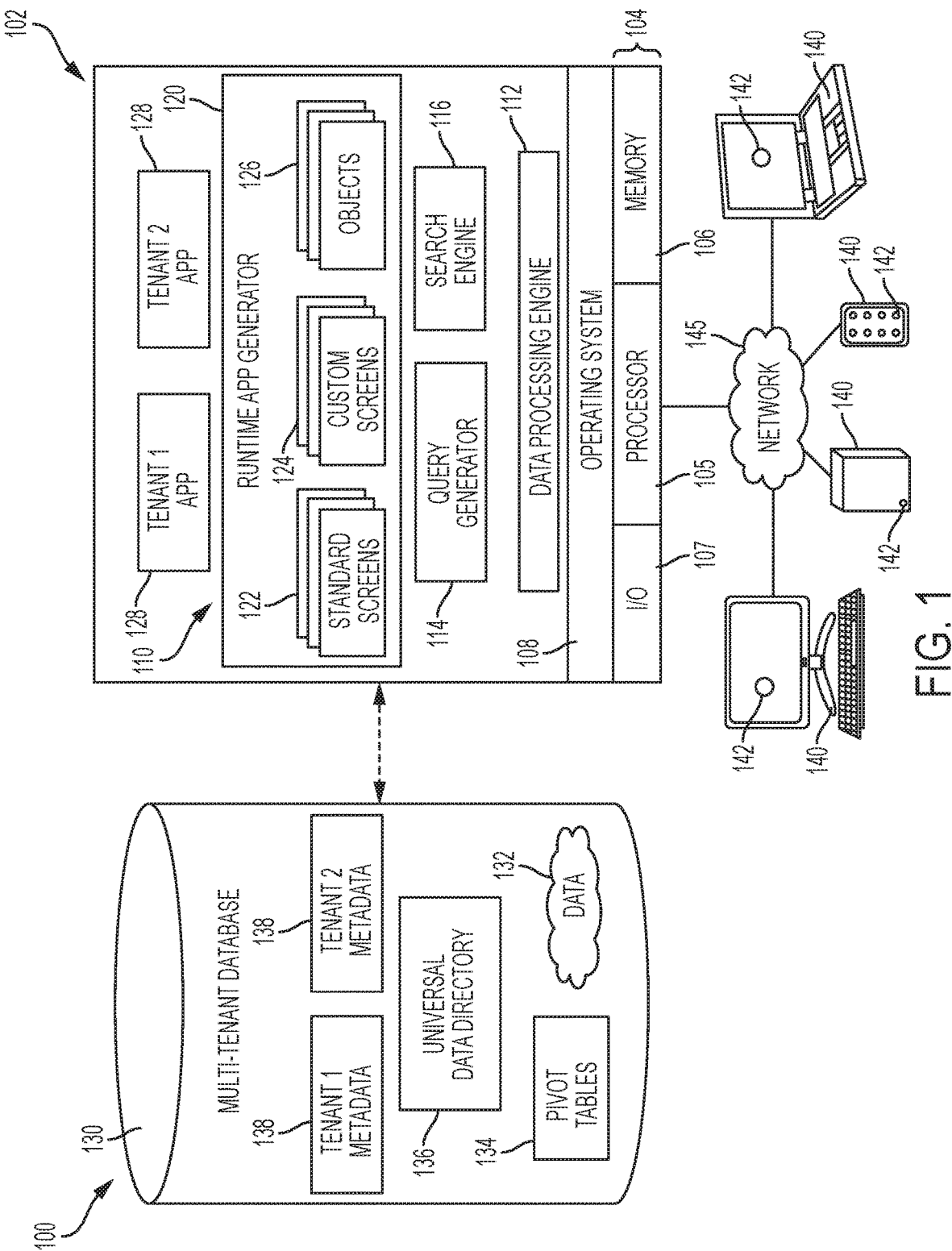
FIG. 1 is a schematic block diagram of an example of a multi-tenant computing environment in which features of the disclosed embodiments can be implemented in accordance with some of the disclosed embodiments.

In view of the discussion above, it would be desirable to synchronize applications that are used at all of the different types of user systems (e.g., mobile device, laptop, desktop, tablet) that a particular user may have at their disposal (e.g., at any given time or location) so that when that user switches from using one user system to another user system, the applications at the "new" user system (e.g., that is being switched to) are synchronized with any other applications that were most recently in use at all of the other user systems of that user.

A method and system are provided for implementing session synchronization to synchronize applications at different user systems (e.g., mobile device, laptop, desktop, tablet) of a particular user. As used herein, a "session" can refer to a state in which a particular user system has one or more applications that are open at that particular user system and have an active connection to a server system. For example, in this context, each session is associated with a particular user system and any number of applications associated with that user system. Each session may have a unique identifier session that identifies the particular user system and all applications that are open or active at that particular user system. A session may close when all applications are closed at that particular user system or when a connection to the server system of all applications is terminated for some reason. As will be explained in greater detail below, this platform level solution that can maintain session information received any number of different user systems of the particular user and share this collective session information with each of the other user systems as session-synchronization information that can be used, at any user system of that user, to ensure that when that user switches from using one user system to another user system that that applications at the "new" user system being switched to are synchronized with any other applications that were most recently in use at all of the other user systems of that user.

In one embodiment, a server system includes a session manager module that receives session information from a session management module at each of a number of user systems of the particular user. The system automatically maintains, and updates session-synchronization information needed to synchronize any number of applications at any number of user systems.

The session information provides information about use of one or more applications at each of the user systems. The session information (for each user system) can include: activity status that indicates whether that user system is currently in use or active, indicates which applications are currently in use or active at that user system, and indicates user interaction with each application at that user system and other optional information about that user system like location, network connectivity, available power, etc.

The session manager module maintains the session information received from each of the user systems as collective session information, and periodically or regularly communicates session-synchronization information to each of the user systems that includes at least some of the collective session information. The session manager module is used to track and manage application state at the platform level for all user systems of a particular user, and to provide each user system with information needed to synchronize the state of applications at each user system with other user systems that have recently used a corresponding application. As used herein, in some embodiments, an "corresponding application" may refer to an analogous application that is used at another user system. In other embodiments, a "corresponding application" may refer to an application that has been determined to be the best matching application for a particular user system in comparison to an analogous application that is used at another user system. In some implementations, the session manager module can use mapping techniques select the corresponding application (that is the best match for the particular user system) from a portfolio of available applications (e.g., Salesforce portfolio of applications) at a server system or other cloud-based infrastructure. In this regard, depending on the scenario, a corresponding application may be the same application at two different user systems, or may be a different application at two different user systems. For example, Salesforce running in a web browser as a web application is analogous to the Salesforce Mobile application running on a mobile phone or on a smart watch. Similarly, the Quip application running in the web browser as a web application is analogous to the Quip application running on the mobile phone. Also, Quip is an application itself that runs on a laptop and is still analogous to the Quip application running on the mobile phone. As another example, Salesforce Einstein Analytics running in the web browser as a web application is analogous to the Salesforce Einstein Analytics application running on the mobile phone. In addition, every mobile phone and laptop can have multiple internet browsers and each of these web browsers is analogous to each other (e.g., a Salesforce application running on Google Chrome on a laptop is analogous to Salesforce application running on Safari on a mobile phone). For instance, a user on their laptop can use Salesforce on the web-browser (e.g., Chrome), and when a context switch is triggered, the session manager can identify that there is Google Chrome as well as Salesforce application on the mobile phone, but the session manager would go ahead and open the Salesforce application and not the chrome browser.

When activity status changes (i.e., the particular user switches to using a new user system), the session manager module can automatically switch session context from another one of the user systems to the new user system so that corresponding applications of user systems are synchronized. For example, when the particular user switches from using one of the user systems to another one of the user systems, the session-synchronization information can be used to allow for current usage of applications at each of the user systems to be synchronized so that the transition between different user systems is seamless to the user regardless of whether the corresponding applications at different user systems are different. In other words, when the particular user switches from using one of user systems to using another particular one of the user systems such that it is currently active, the session-synchronization information is used by that particular user system to synchronize applications at that particular user system with corresponding applications that were most recently in use at other user systems. So, for example, if the user is using Salesforce via a web browser at their laptop, and then starts using her mobile device, the Salesforce mobile application will track what was being done at the laptop. Even though the Salesforce application being used at the laptop is different than the corresponding Salesforce mobile application being used at the mobile device, the usage of both applications will be synchronized to match when the user starts using the Salesforce mobile application at her mobile device despite the fact that the two applications are different. The session context can be switched between the user systems regardless of manufacturer because sessions of all user systems are managed by the session manager module at the server system (e.g., at the platform level).

The session manager module can detect many different types of trigger events that will serve to trigger switching session context between two user systems (e.g., receiving an indication that an application has become active at a user system, or will become active due to occurrence of certain conditions, or should become active due to occurrence of other conditions). In general, trigger events can be usage-based trigger events, or automatic switch-over trigger events. Examples of the usage-based trigger events can be receiving an indication that an application has been launched at a user system that was previously inactive and has become active, or that there has been user interaction with an application that was previously launched and that is has become active after a time period. Examples of the automatic switch-over trigger events include calendar-based trigger events; location-based trigger events; battery or other power-based trigger events; and network connectivity-based trigger events.

The session manager module can track several different types of information for each user system. For instance, the session manager module can maintain an activity log for each user system of the user. For example, in one embodiment, the activity log can include a list of applications that are currently active (e.g., currently in use) or that have recently been (e.g., within a certain time period) in use, along with user interaction information for each application that describes most recent interaction with the application.

The session manager module can include an intelligence module that can intelligently determine the mapping of applications between each of the user systems of the particular user, as well as appropriate application links for each application that can be used by a particular user system to access appropriate applications when a session context is switched to that particular user system. The form of the application links can vary depending on the implementation, and factors such as the context of the application and form factor of user system. The session manager module can also determine and maintain context mapping information. The context mapping information maps applications at that user system to other corresponding applications at other user systems that are currently active or that have recently been in use at one of the other user systems (e.g., within a certain time threshold). For example, in one embodiment, the context mapping information can include an application type/name for each application (that is in use at other user systems or that has recently been in use at the other user systems), user interaction information for each application (that is in use at other user systems or that has recently been in use at the other user systems), and an application link to a corresponding application at that user system. In one implementation, each application link is used by a user system, when the session context is switched to that user system (e.g., when that user system becomes currently active) to access a corresponding application at that user system in accordance with most recent user interaction with the application (i.e., as it was most recently in use at another user system).

To explain further, each application link provides a particular user system with a way to access a corresponding application at that particular user system that corresponds to an application that has been in use at another one of the other user systems (e.g., currently in use or in use within the time threshold prior to session context being switched). When that particular user system becomes active and the session context is switched to that user system, each application link for that particular user system can be used to access the corresponding application. In other words, when the session context is switched to that particular user system, each application link can be used by that particular user system to access the corresponding application in accordance with a most recent user interaction with an application at one of the other user systems. The corresponding application is not necessarily the same application that was in use at the one of the other user systems prior to the session context is being switched to that particular user system.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102, also referred to as a server system or includes cloud-based infrastructure herein, that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long-term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records.

Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 2A:
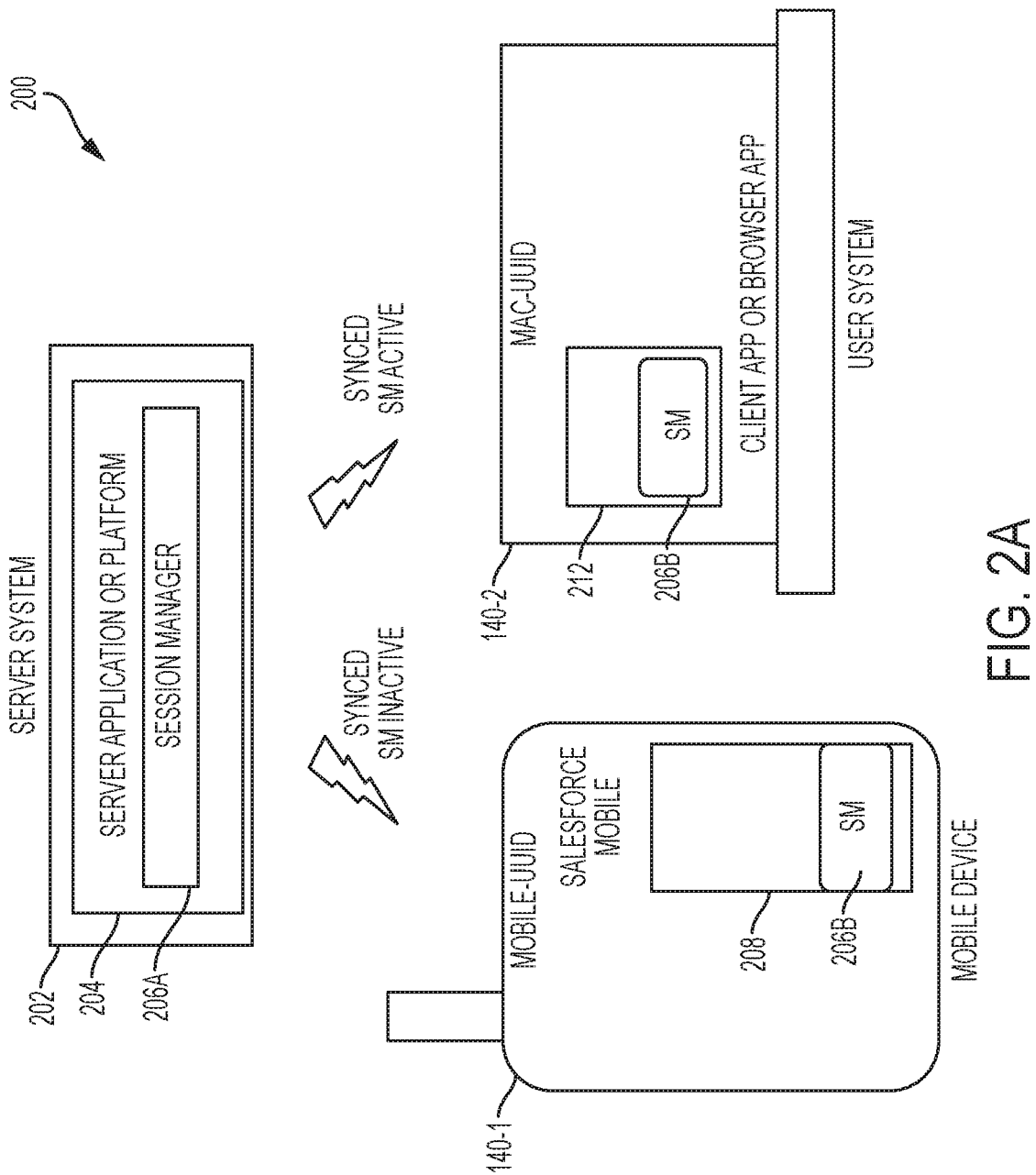
FIG. 2A is a block diagram that illustrates one example of a system in accordance with the disclosed embodiments.

Session Synchronization and Sharing of Applications Between Different User Systems of a User FIG. 2A is a block diagram that illustrates one example of a system 200 in accordance with the disclosed embodiments. The system 200 includes a server system 202, a user system 140-1 that is implemented as a mobile client, and a user system 140-2 implemented as a non-mobile client (e.g., desktop, laptop or tablet devices, etc.). FIG. 2A represents one non-limiting example where the system 200 includes two user systems 140; however, it should be appreciated that the system 200 can include any number of user systems 140 that operate in conjunction with the server system 202.

The server system 202 communicates with user systems 140-1, 140-2. The server system 202 includes a server application 204, or application platform 204 that serves applications to user systems. In some implementations, the server system 202 can be implemented, for example, as part of a cloud-based application platform.

The user system 140-1 includes an application 208 that corresponds to the server application 204. In one embodiment, the application 208 is a mobile client application 208 or application platform 208, such as Salesforce Mobile®.

The user system 140-2 includes a client application 212 and/or browser application 212 (e.g., Salesforce cloud application) that corresponds to the server application 204. In one embodiment, the client application 212 can run within the browser application 212.

At any given time, a particular user system can be "active" or "inactive." A particular user system can be "active," for example, when it is turned on, when it has an active network connection (e.g., that is communicating information with another entity), and/or when an application at that particular user system is currently in use or has recently been in use within some time threshold. A particular application can be "active" when it is open and there has been user interaction with an application within a certain time period or threshold.

By contrast, a particular user system can be "inactive," for example, when it is powered off, when it has no network connection, and/or when no application at that particular user system is currently in use or has recently been in use within some time threshold. At any given time, a particular application at a particular user system can be "active" or "inactive." A particular application can be "inactive" when it is closed or when there has not been user interaction with an application within the certain time period or threshold.

In accordance with the embodiment illustrated in FIG. 2A, methods and systems for session synchronization and sharing of applications between different user systems of a particular user including methods for session management that facilitate session synchronization and session sharing between the different user systems of the particular user. These methods and systems can be implemented using a session manager module 206A at the server system 202 and session management modules 206B at the user systems 140-1, 140-2.

As will be described in greater detail below, each instance of the session management module 206B sends session information to the session manager module 206A on a regular basis, and the session manager module 206A maintains this session information for each of the user systems that are associated with a particular user, and shares at least some of the session information for each of the user systems that are associated with a particular user with each of the user systems. In some implementations, the session manager module 206A shares all of the session information for each of the user systems that are associated with the particular user with each of the user systems. However, in other optimized implementations, the session manager module 206A shares only the session information for each of the user systems that is needed (e.g., if the user opens and closes a document and just reads it, then this insignificant session information is not needed and can be ignored and not shared). This session information can include information that indicates whether the user system is currently in use or active, information about applications that are in use and those that are not, information about user interaction with each application, status updates regarding whether an application has been launched or recently interacted with, etc.

In some embodiments, each instance of the session management module 206B can also send other information to the session manager module 206A on a regular basis, such as, updates about location of the user system with respect other user systems of the user, device constraints such as available power or battery state, network connectivity of user system, calendar information, etc. The calendar information can include, for example, calendar updates from any calendaring system associated with the particular user, calendar updates that indicate the location of the meeting to indicate if it is a remote or local meeting room, status of a calendar invitee which reflects that the user has accepted the meeting, etc.

Figure 2B:
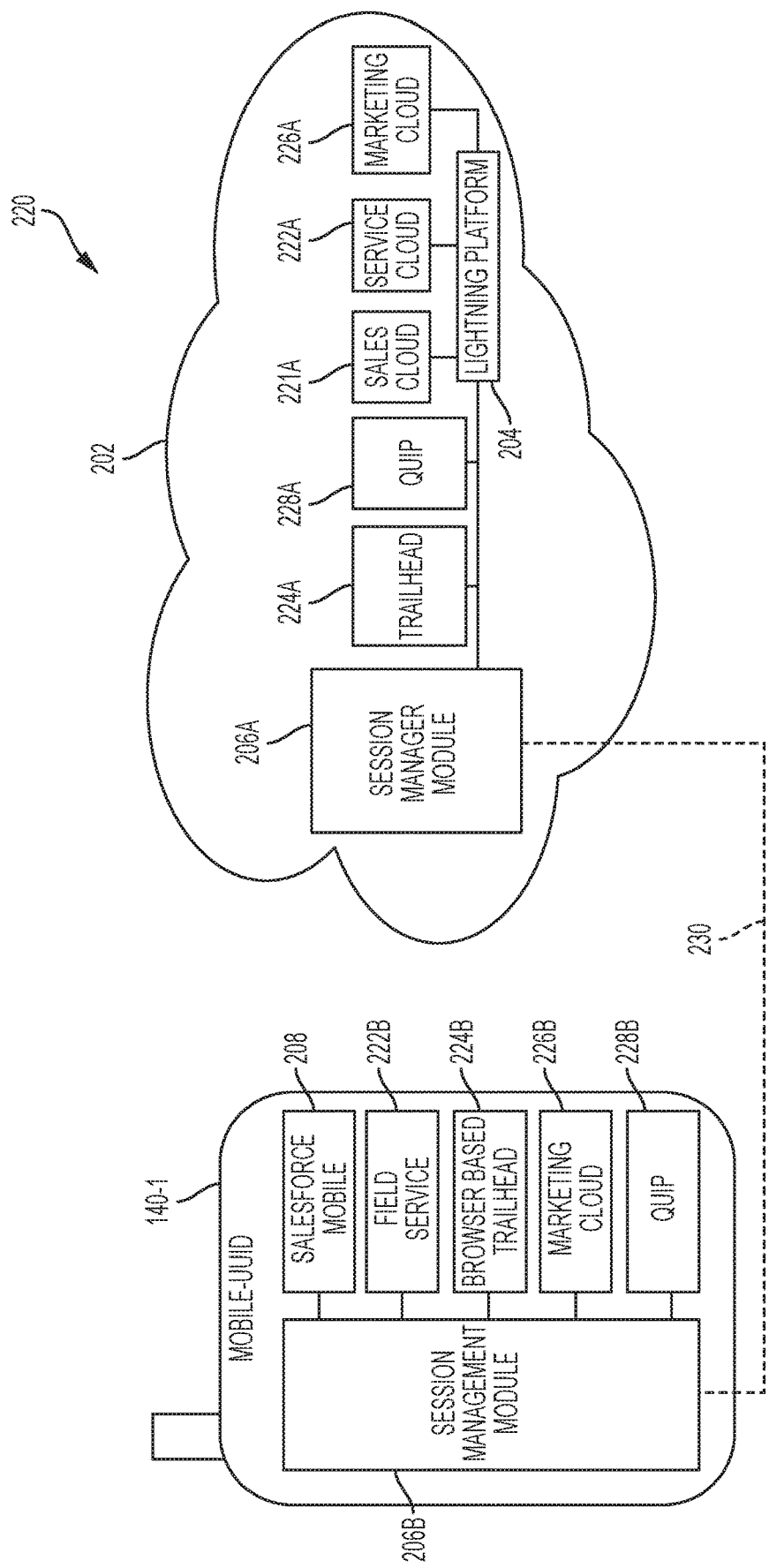
FIG. 2B is a block diagram that illustrates another example of a system and mappings between applications in accordance with the disclosed embodiments.

FIG. 2B is a block diagram of a system 220 that illustrates session management between the session manager module 206A of server system 202 and the user system 140-1 of FIG. 2A in accordance with the disclosed embodiments. FIG. 2B includes some of the same features as FIG. 2A, and therefore FIG. 2B will be described with continued reference to FIG. 2A.

The system 220 includes the server system 202 having the session manager module 206A, and the user system 140-1 that has the session management module 206B and that is implemented as a mobile client as described above with reference to FIG. 2A. The user system 140-1 can have an "active" session with the server system 202, as represented by link 230, meaning that the user system 140-1 is turned on and at least one application at the user system 140-1 has an active network connection to the server system 202 (e.g., an application at the user system 140-1 is open, and that there has been user interaction with the application within a certain time period or activity time threshold).

The server system 202 communicates with user system 140-1, and includes a portfolio of applications 221A, 222A, 224A, 226A, 228A. Some of these applications 224A, 228A are independent, while other applications 221A, 222A, 226A, 228A share and leverage a cloud-based application platform 204, such as Salesforce Lightning®. In this non-limiting example, which is for illustration purposes only, there server system 202 includes: a Trailhead® application 224A, a Quip® application 228A, a CRM Sales Cloud® application 221A, a Service Cloud® application 222A, and a Marketing Cloud® application 226A.

The user system 140-1 includes several corresponding mobile applications 208, 222A, 224A, 226A, 228A each of which corresponds to at least one of the portfolio of applications 221A, 222A, 224A, 226A, 228A. In this non-limiting example, which is for illustration purposes only, the user system 140-1 has five mobile applications: a Salesforce Mobile® client application 208 that corresponds to the CRM Sales Cloud® application 221A at the server system 202 and parts of the Service Cloud® application 222A at the server system 202; a Field Service® application 222B that corresponds to the service cloud application 222A at the server system 202; a web browser-based Trailhead® application 224B that corresponds to the Trailhead® application 224A application at the server system 202; mobile Marketing Cloud® application 226B that corresponds to the Marketing Cloud® application 226A at the server system 202; and Quip® application 228B that corresponds to the Quip® application 228A at the server system 202.

As will be explained in greater detail below with reference to FIGS. 3 through 7B, when a session context switch occurs to the user system 140-1 (from another user system that is not shown in FIG. 2B), the session manager module 206A can use mapping techniques select a corresponding application for that user system 140-1, that is the best match for the particular user system 140-1, from a portfolio of available applications (e.g., Salesforce portfolio of applications), and provide appropriate applications links (and other information) the particular user system 140-1 so that the session that was taking place at other user systems prior to the context switch is synchronized with applications at the particular user system 140-1. For example, if the user was using his laptop to interact with or edit an object of the CRM Sales Cloud® application 221A, and the user switches to using his mobile device 140-1, the session manager module 206A will ensure that the mobile device 140-1 has the information needed to automatically open an instance of the corresponding Salesforce Mobile® client application 208 at the mobile device 140-1 that is synchronized with the same object so that the user experiences a seamless transition and can continue working. On the other hand, if the Salesforce Mobile® client application 208 was not available at the mobile device 140-1, then a prompt can be displayed asking the user if they want to install the corresponding Salesforce Mobile® client application 208 at the mobile device 140-1, and if the user does not wish to install the application, then the session manager module 206A will ensure that the mobile device 140-1 has the information needed to automatically open a web browser-based instance of the corresponding the CRM Sales Cloud® application 221A at the mobile device 140-1 (that is synchronized with the same object so that the user experiences a seamless transition and can continue working).

Figure 3:
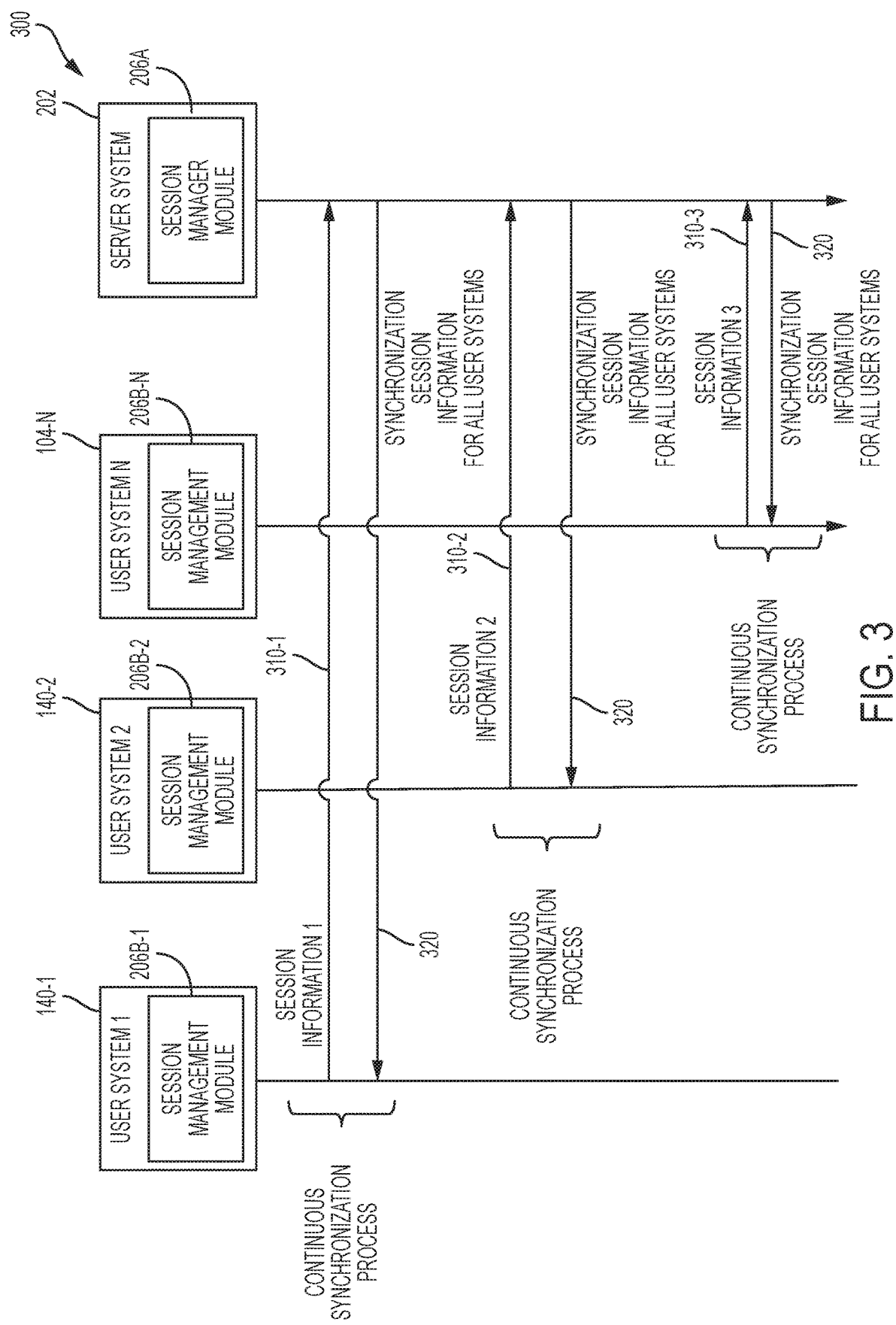
FIG. 3 is a flow diagram illustrates a number of user systems that are associated with a particular user and a server system in accordance with the disclosed embodiments.

FIG. 3 is a flow diagram illustrates a number of user systems 140-1 . . . 140-N that are associated with a particular user and a server system 202. FIG. 3 will be described with continued reference to FIG. 2A. The server system 202 includes a session manager module 206A. Each of the user systems 140 includes a session management module 206B. As illustrated in FIG. 3, each of the user systems 140 periodically or regularly provides session information to the session manager module 206A of the server system 202 on a regular basis. Each of the user systems 140 can also provide session information to the session manager module 206A of the server system 202 on demand or on request, or in response to the occurrence of an event or condition. In FIG. 3 this is illustrated by arrows 310-1, 310-2, and 310-3. The session manager module 206A maintains this session information and uses it to provide session-synchronization information for all user systems to each of the various instances of the user systems 140 to implement a session synchronization process between each of the user systems 140 in the server system 202.

For example, the user system 140-1, and in particular the session management module 206B-1, provides session information 310-1 to the session manager module 206A on a regular basis. Likewise, user system 140-2 also provides session information 310-2 to the session manager module 206A of server system 202 on a regular basis (e.g., periodically or on a schedule or in response to a condition or event). Each user system 140 provides session information that is maintained by the session manager module 206A of the server system 202. The session manager module 206A can provide regular updates of the session-synchronization information to each of the user system 140 so that session information is synchronized between all the user system 140. The session-synchronization information can be provided from the session manager module 206A periodically, regularly (e.g., in accordance with a schedule), or in response to the occurrence of a condition or event such as a request. This synchronization process that is illustrated in FIG. 3 allows for the session manager module 206A to provide each of the user systems 140 with updated session information for each of the user systems.

As a result, any particular time, all of the user systems 140 have information needed to synchronize applications at each user system 140. This way, if the user switches from using one of the user system 140 to another of the user system 140, the applications that are executing at the user system 140 being switched from will synchronized with corresponding applications that are (or will be) executed at the new user system 140 that the user is currently using.

Figure 4:
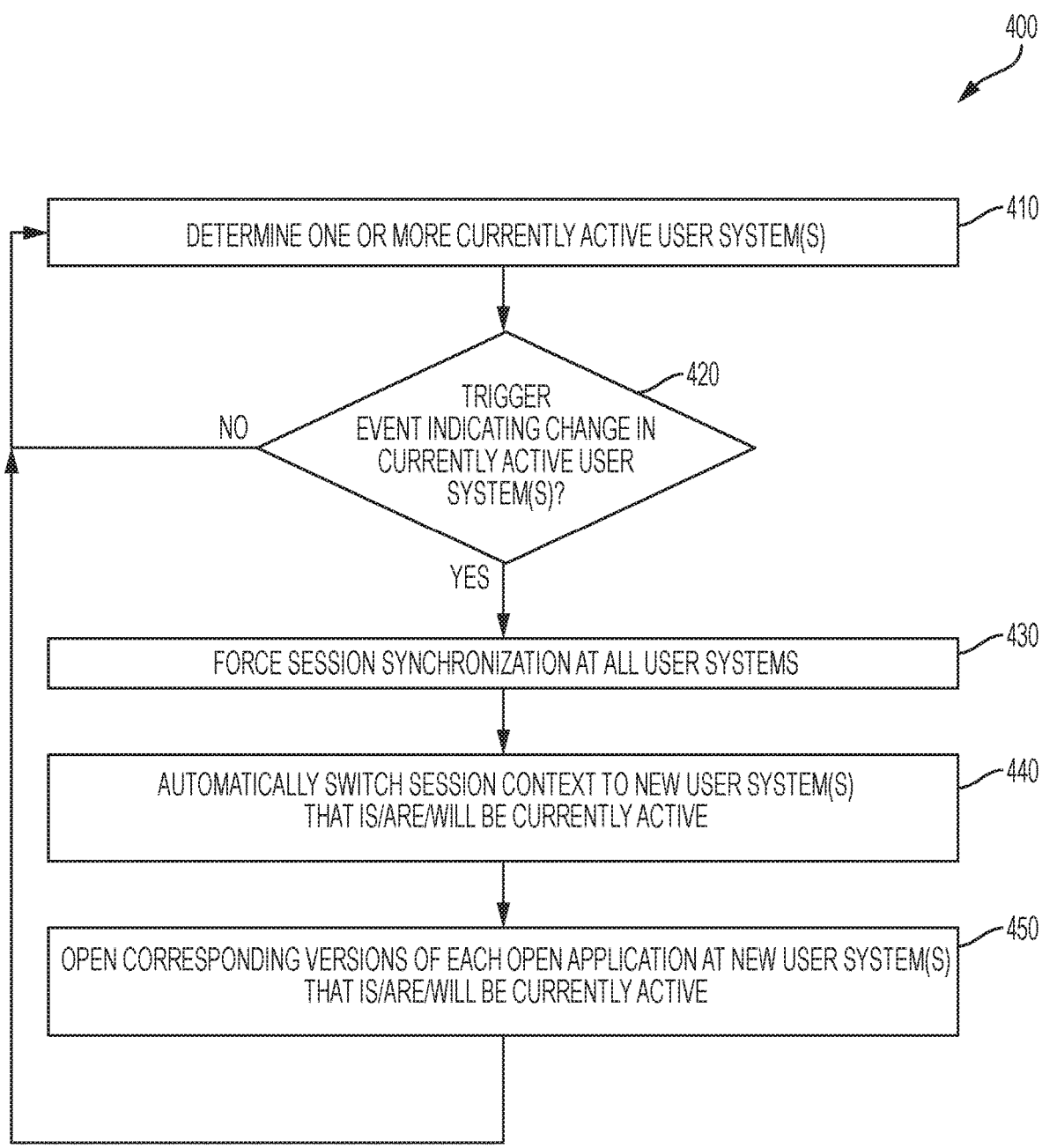
FIG. 4 shows a method in accordance with the disclosed embodiments.

FIG. 4 shows a method 400 in accordance with the disclosed embodiments. FIG. 4 will be described with continued reference to FIGS. 2A and 3. The method 400 begins at 410, where the session manager module 206A determines which user systems are currently active. In most cases, one user system will be currently active, but it should be appreciated that in other use cases that more than one user system could be currently active in some scenarios.

At 420, the session manager module 206A continuously monitors for different types of trigger events. The trigger events can indicate that the currently active user system has changed to a new "currently active" user system, will be changing to a new "currently active" user system or that it should change to a new "currently active" user system. The trigger events that are monitored by the session manager module 206A can include, for example, usage-based trigger events and automatic switch-over trigger events.

Examples of usage-based trigger events can include receiving an indication that an application has been launched at a new user system (that is not currently active), or receiving an indication that there has been user interaction with an application that was previously launched at a new user system (that is not currently active) after a time period has passed since previous interaction by the user.

Examples of automatic switch-over trigger events can include, for example, calendar-based trigger events such the present or upcoming occurrence of a calendar event; location-based trigger events, such as location of mobile device that is currently active coming near a laptop or desktop computer that is not currently active; power-based trigger events such as a low battery at currently active user system (e.g., a mobile device or tablet having a low battery); network connectivity-based trigger events such as an indication of bad wireless network or coverage for the currently active user system, etc.

Referring again to FIG. 4, when the session manager determines (at 420) that a trigger event has not occurred, the method 400 loops to 410. When the session manager determines (at 420) that a trigger event has occurred, the method 400 proceeds to 430.

At 430, the session manager forces a session synchronization at all user systems for the particular user. The method 400 then proceeds to 440 where the session manager automatically switches the session context to the new user systems that will become the currently active user systems. The method 400 then proceeds to 450, where corresponding applications at the new user system that is now currently active are opened. In this regard it should be noted that the corresponding applications are not necessarily the same application that was being executed at the user systems that were previously the currently active user systems. This will be described in greater detail below with reference to FIG. 7.

It is noted that steps 430 through 450 can all take place simultaneously or nearly simultaneously so that transition (e.g., from the currently active user system to the new user system that is the new currently active user system) is seamless from the user's perspective.

FIGS. 5 and 6 collectively illustrate session information that is maintained by the session manager module 206A for all user systems belonging to a particular user. FIGS. 5 and 6 will be described with continued reference to FIGS. 2A-4.

In particular, FIG. 5 is a table 510 that illustrates a log of the user systems maintained by the session manager module 206A in accordance with the disclosed embodiments. The table 510 is also referred to herein as a user system log table or user system log. The first column of the table 510 includes a list of user systems of the particular user that includes an identifier for each user system, and column 2 of table 510 indicates the activity status of each user system that indicates whether it is currently active or currently inactive. Although FIG. 5 only shows two user systems (Mac-UUID, Mobile-UUID) in this example it should be appreciated that the table 510 could include any number of user systems associated with a particular user. In addition, it should be noted that any number of user systems could be currently active depending on the implementation. As such, table 510 provides information regarding how many user systems are connected, information regarding which user systems are currently active as well as which user systems are currently inactive. Although not illustrated in FIG. 5, table 510 can also include other optional information for each user system such as: state and health information for each user system, for example, the current battery state, or current network connectivity state; and other information regarding how to interact in response to certain trigger events.

FIG. 6 is a table 610 that illustrates an activity log for one of the user systems from FIG. 5 that is maintained by the session manager module 206A in accordance with the disclosed embodiments. The table 610 is also referred to herein as an activity log table or activity log. The activity log table can include information about each user system that is included in the user system log of FIG. 5. For consistency with FIG. 2A, to illustrate one non-limiting example in FIG. 6, it is presumed that the user system 140-2 (e.g., a laptop having an identifier Mac-UUID) has three applications that are currently active and/or have recently been active: Quip, Work Order, and Trailhead, and that another user system 140-1 (e.g., a mobile device having an identifier Mobile-UUID) has one application that is currently active and/or have recently been active: an opportunities object of a CRM application. Although FIG. 6 only shows two user systems in column 1 of the activity log table 610 in this particular example, it should be appreciated that the table 610 could include any number of user systems associated with a particular user. In one embodiment, the user system can be any user systems, regardless of whether they are currently inactive or are currently active. As noted above, any number of user systems could be currently active depending on the implementation.

The first column of the table 610 includes identifies two user systems (having an identifier Mac-UUID and mobile-UUID) of the particular user, column 2 of table 610 indicates a name of each application that is currently being used at each user system (or that has recently been used at each user system within a certain time constraint), and column 3 of table 610 indicates the user activity or interaction information for each application in column 2 including the most recent/current interaction with the application. Although not shown in column 3 of the table 610, it should be appreciated that table 610 can also store other user activity or interaction information for each application, but due to space constraints, only the most recent/current user activity or interaction with each application is illustrated in FIG. 6. In this non-limiting example, which is for illustration purposes only, the user system 140-2 has three web browser-based applications that are currently or recently in use: a web browser-based Quip application in which a document is being edited, a web browser-based work order application that is being used to create a work order for a field user, and a web browser-based trailhead application that is being used to view and interact with a trailhead module, while user system 140-1 has a mobile web browser-based CRM application, specifically an opportunities object, that is being viewed and interacted with. With respect to the web browser-based Quip application the user has most recently made an edit to a document titled "214 release planning." With respect to the web browser-based work order application, the user has most recently created a work order and added detail to it (5000M00000igstr->details). With respect to the web browser-based trailhead application the user has most recently been interacting with a learning module titled Mobile SDK training. With respect to the web browser-based mobile CRM application, the user has most recently viewed and edited details of an opportunity record (0060M00001456QmQAI).

As such, table 610 provides information regarding which applications are currently in use or recently in use (e.g., have been in use within the time threshold) for any of the user systems, and information regarding user activity or interaction information for each application including the most recent/current interaction with the application.

Although not illustrated in FIG. 6, table 610 can also include other optional information for each user system that is currently active such as: an application link to each application; a version number for each application; organization details for each application, etc. An application link is a reference that is linked to an application. An application link can specify the application's location on a computer network and a method for retrieving that application. An application link can be, for example, a Uniform Resource Identifier (URI) (e.g., a string of characters used to identify a resource), such as a Uniform Resource Locator (URL) or "web address." Each application link can be used to access the most recent user activity or interaction with the application across all user system (e.g., the application link can be used via a web browser of a laptop to access a specific document or edits the user was most recently working on at a mobile device). To explain further, each application link provides a particular user system with a way to access a corresponding application at that particular user system that corresponds to an application that has been in use at another one of the other user systems (e.g., currently in use or in use within the time threshold prior to session context being switched). When that particular user system becomes active and the session context is switched to that user system, each application link for that particular user system can be used to access the corresponding application. In other words, when the session context is switched to that particular user system, each application link can be used by that particular user system to access the corresponding application in accordance with a most recent user interaction with an application at one of the other user systems. It should be pointed out that the corresponding the application is not necessarily the same application that was in use at the one of the other user systems prior to the session context is being switched to that particular user system.

In some embodiments, the version number for each application can be used by the session manager module to determine if there is a version difference between a version of an application used at one user system and another version of the application being used at the user system that the session context is being switched to. When a version mismatch is detected, and the version of the application being used at the user system that the session context is being switched to has reduced functionality (in comparison to the version of the application that was being used at the user system the session context is being switch from), the session manager module can prompt the user at the user system that the session context is being switched to update to the newer version of the application that has the enhanced functionality so that the user can resume working in an application that has a full set of features without loss of functionality that would otherwise be experienced. If the user declines the opportunity to update to the newer version, the current version of the application (i.e., with reduced functionality) can be opened at the particular user system with limited functionality. Alternatively, the user could also be presented with an option to open an alternative form of the application. In most cases, different versions of the same application are backwards compatible; however, in the event backwards compatibility is not present, then the version of the application being used at the user system that the session context is being switched to has enhanced functionality (in comparison to an older version of the application that was being used at the user system the session context is being switch from), the session manager module can prompt the user at the user system that the session context is being switched to with an option to open an older version of the application so that there is no version mismatch between the version that was being used and the newer version that will be used after the context switch.

FIGS. 7A and 7B are a set of tables 710, 720 that illustrate how the activity log table 610 of FIG. 6 is used for context mapping by the session manager module 206A between different user systems when the currently active user system changes in accordance with the disclosed embodiments. FIGS. 7A and 7B will be described together with continued reference to FIG. 2A-6. The activity log table 610 is described above with reference to FIG. 6, and for sake of brevity the description will not be repeated here again.

Tables 710, 720 of FIGS. 7A and 7B illustrate examples of session mappings between two different user systems (of FIG. 2A) of a user at a particular time. In this example, the session manager automatically switches the session context from the laptop (Mac-UUID) 140-2 to the mobile device (Mobile-UUID) 140-1 that will become the currently active user system. When the session context is switched, each application that was in use at the laptop (Mac-UUID) 140-2 can be mapped to corresponding applications that correspond to each application at the mobile device 140-1 that is now currently active. In this regard it should be noted that the corresponding applications that are opened at the mobile device 140-1 are not necessarily the same applications that were being executed at the laptop 140-2 (i.e., that was previously the currently active user system).

Table 710 of FIG. 7A shows how applications from the activity log table 610 for a particular session map to web browser-based applications at the laptop (Mac-UUID) 140-2 when the laptop is the currently active user system. In particular, the first column of the table 710 includes an identifier (Mac-UUID) of laptop of the particular user, column 2 of table 710 indicates an application type/name of each application that is in use by the laptop (e.g., column 2 can include either an application type or application name), column 3 of table 710 includes a corresponding application link for each application that is in use by the laptop, and column 4 of table 710 indicates the user activity or interaction information for each application including the most recent/current interaction with the application. For each application type/name included in column 2, column 3 includes a corresponding application link that can be used to access the most recent user activity of interaction with the application. In addition, it should be noted that although not illustrated, in other embodiments, the activity log table 610 can also include other additional information. Non-limiting examples of this other additional information can include policies or rules that apply to synchronization, such as, set a time limit regarding how much information should be synchronized (e.g., do not synchronize anything that is less than a certain time period old), or synchronize that last X number of changes at the application.

In this non-limiting example, which is for illustration purposes only, the laptop has four web browser-based applications that are currently in use: a web browser-based Quip application, a web browser-based work order application, a web browser-based trailhead application, and a web browser-based CRM application. With respect to the web browser-based Quip application the user has most recently made an edit to a document. With respect to the web browser-based work order application, the user has most recently created details of a work order (5000M00000igstr). With respect to the web browser-based trailhead application the user has most recently been interacting with a module titled Mobile SDK training at Intro_Scenarios_para_2. With respect to the web browser-based CRM application the user has most recently edited details of an opportunities record (0060M00001456QmQAI).

Table 720 of FIG. 7B shows how applications from the activity log table 610 for a particular session map to mobile applications at the mobile device (Mobile-UUID) 140-1 when the mobile device is the currently active user system. In particular, the first column of the table 720 includes an identifier (Mobile-UUID) of mobile device of the particular user, column 2 of table 720 indicates an application type/name of each application that would be used by the mobile device (e.g., column 2 can include either an application type or application name), column 3 of table 720 indicates a corresponding application link for each application that would be used by the mobile device, and column 4 of table 720 indicates the user activity or interaction information for each application including the most recent/current interaction with the application.

In this non-limiting example, which is for illustration purposes only, the mobile device has four mobile applications that are currently in use: Quip, a field service application, a Salesforce mobile trailhead application, and another Salesforce mobile CRM application. With respect to the Quip application the user has most recently made an edit to a document at paragraph3. With respect to the field service application, the user has most recently created details of a work order (5000M00000igstrQAA). With respect to the Salesforce mobile trailhead application the user has most recently been interacting with a module titled Mobile SDK training at Intro_Scenarios_para2. With respect to the Salesforce mobile CRM application, the user has most recently edited details of opportunities record (0060M00001456Qm).

For example, if the user was using a web browser to edit a document using the web browser-based Quip application, the application link used in the browser to access that document could be: salesforce.quip.com/yJmlAta6AYO2#EQEACAQkztb. If the user then wanted to continue editing the same document using a mobile application at their mobile device, then the application link to access that same document could be salesforce.quip.com/yJmlAta6AYO2.

As another example, if the user was using a web browser to create a work order using the web browser-based work order application, the application link used in the browser to access that document could be: org62.lightning.force.com/one/one.app#/sObject/5000M00000igstrQAA/view. If the user then wanted to continue creating the same work order using a mobile field service application at their mobile device, then the application link to access that same document could be: WO->5000M00000igstrQAA.

As another example, if the user was using a web browser to view and interact with a trailhead module using the web browser-based Trailhead application, the application link used in the browser to access that document could be: trailhead.salesforce.com/en/modules/mobile_sdk_introduction/units/mobilesdk_intro_scenarios If the user then wanted to continue viewing and interacting with the same trailhead module using a Salesforce mobile Trailhead application at their mobile device, then the application link to access that same trailhead module could be: Trailhead->MobileSDK_intro_scenarios.

As another example, if the user was using a web browser to view and edit details of an opportunity record using the web browser-based CRM application, the application link used in the browser to access that opportunity record could be: org62.lightning.force.com/one/one.app#/sObject/0060M00001456QmQAI/view. If the user then wanted to continue to view and edit details of that same opportunity record using a Salesforce mobile CRM application at their mobile device, then the application link to access that same opportunity record could be: Opportunities->0060M00001456Qm.

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

Figure 8:
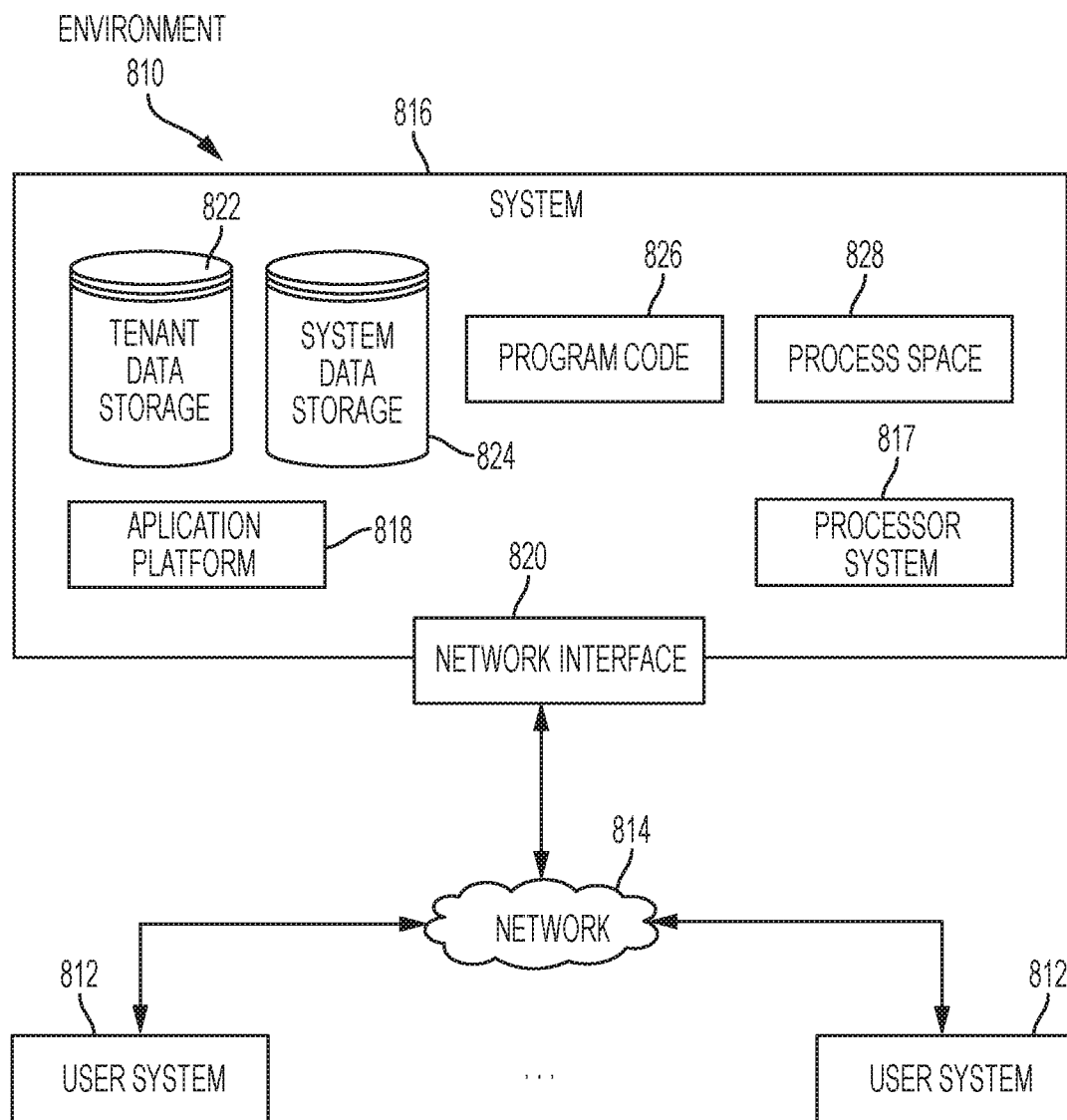
FIG. 8 is a block diagram that illustrates an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloudbased system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third-party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third-party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
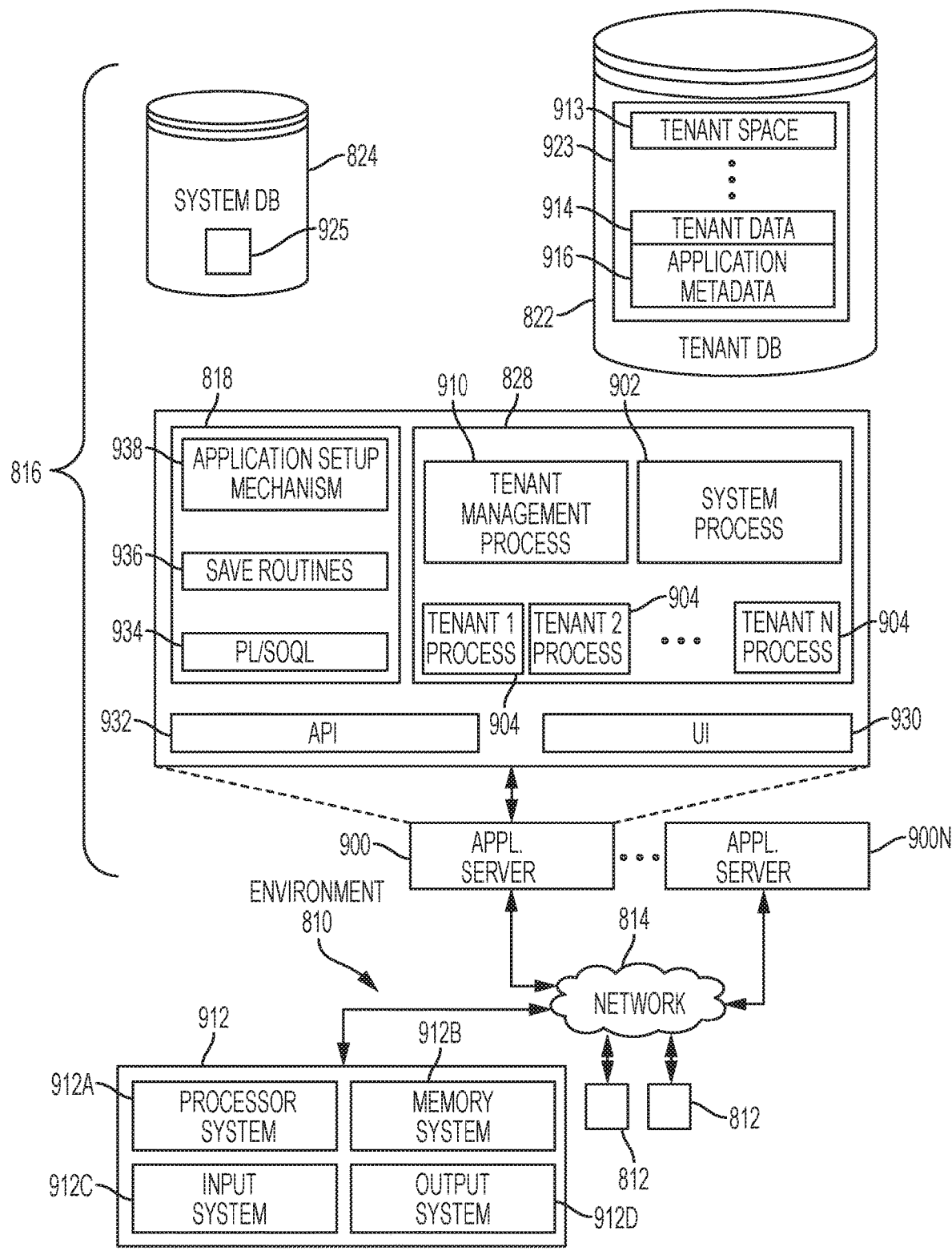
FIG. 9 is a block diagram that illustrates example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server 900$_1$ can be coupled via the network 814 (for example, the Internet), another application server 900$_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
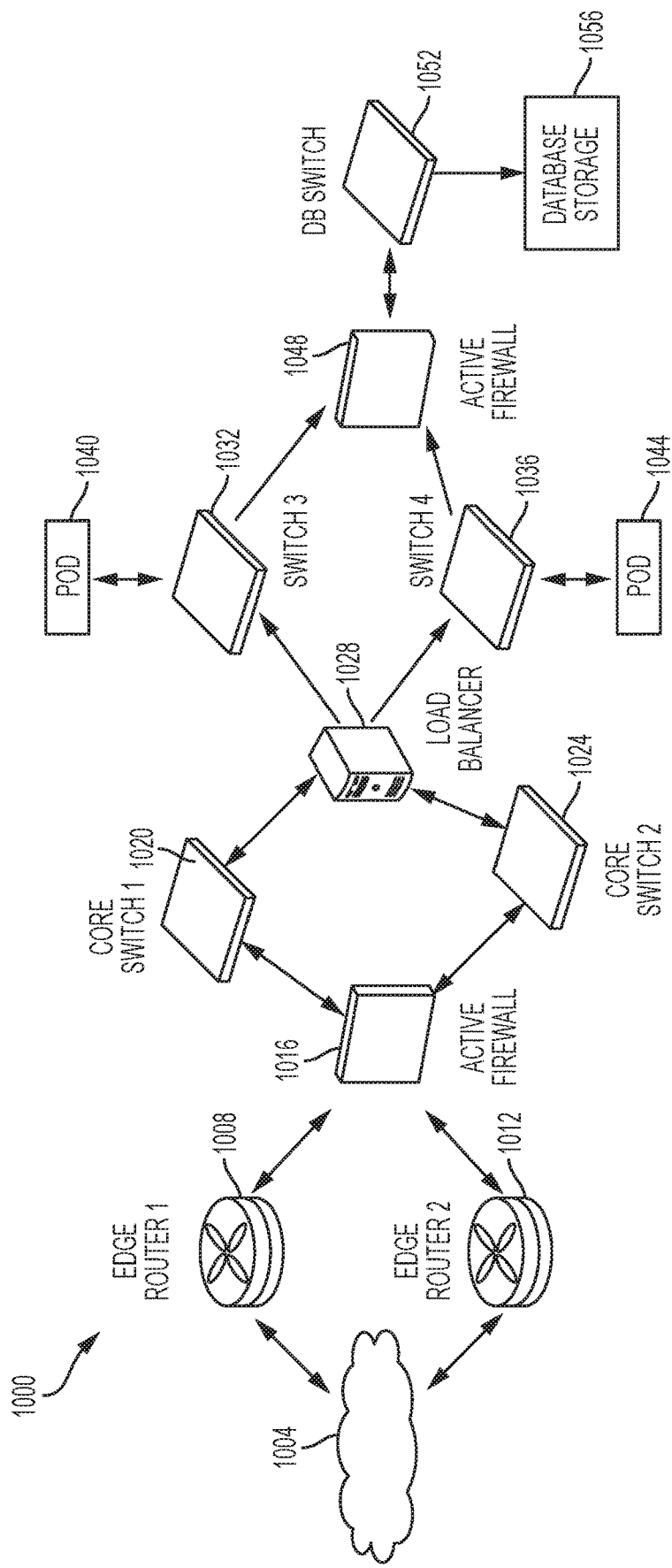
FIG. 10A is a block diagram that illustrates example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
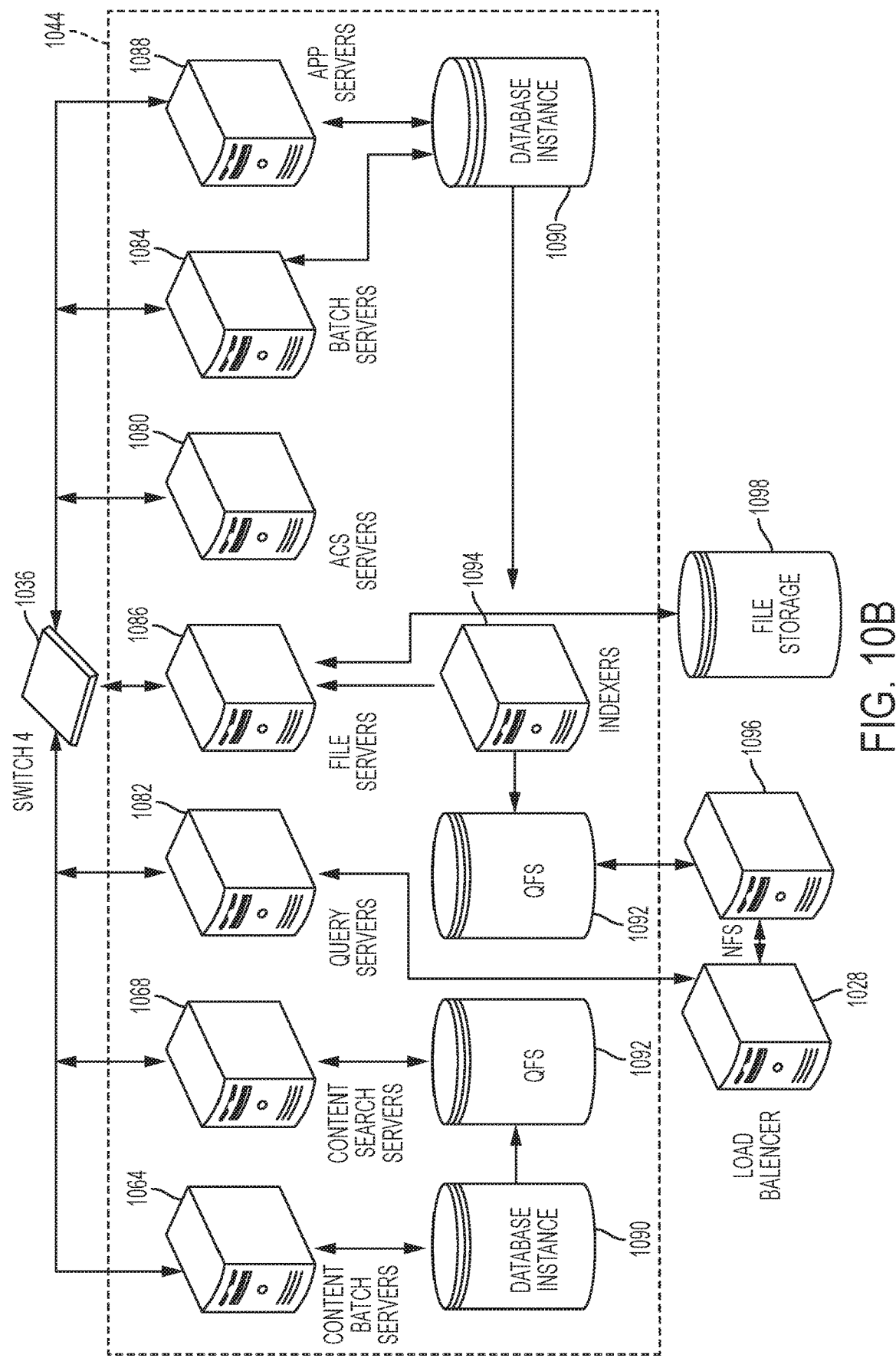
FIG. 10B is a block diagram that further illustrates example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
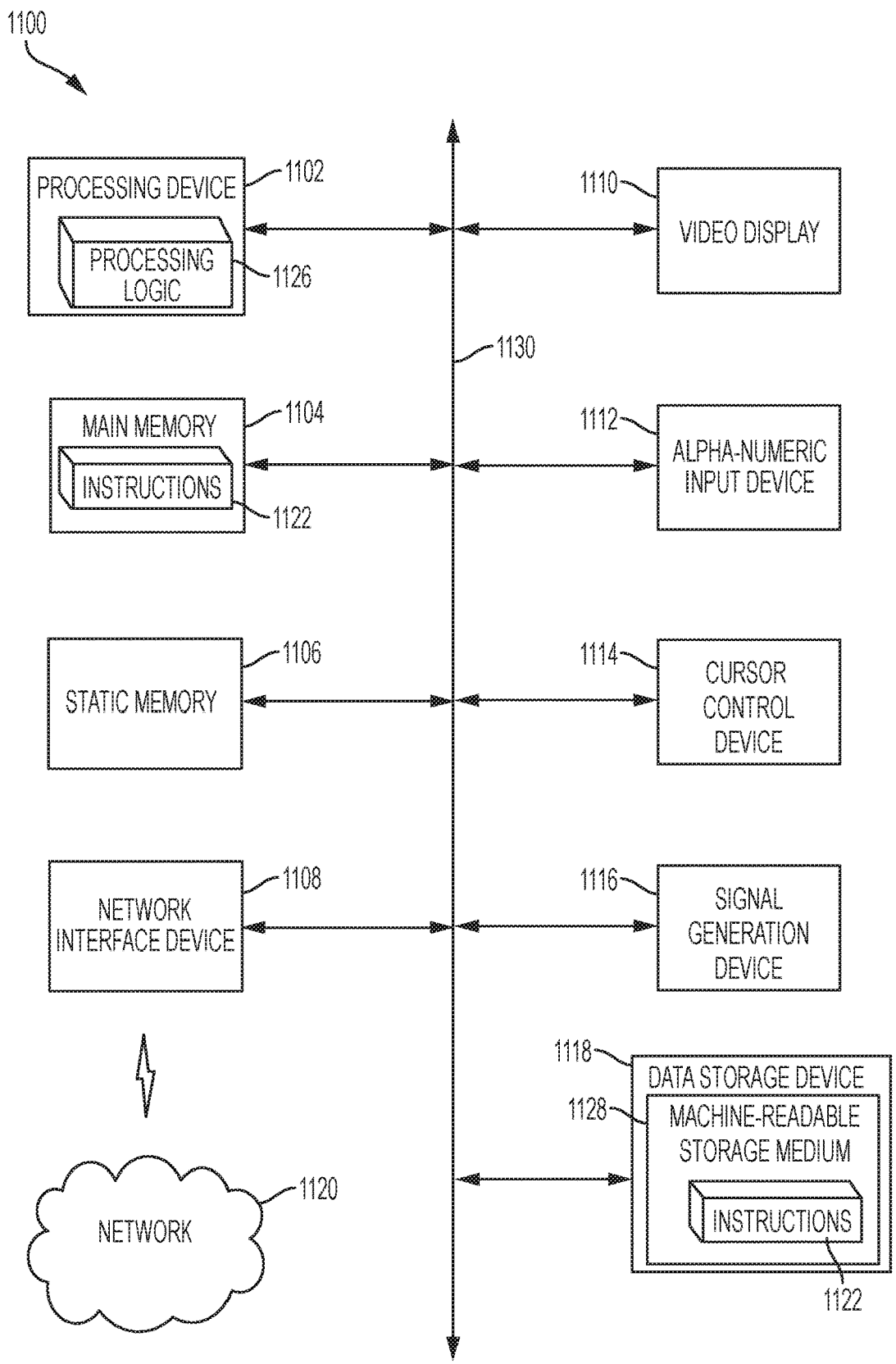
FIG. 11 is a block diagram that illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
    a cloud-based application platform comprising a server system that is configured to serve a plurality of different types of cloud-based applications provided over the cloud-based application platform to each of a plurality of user systems each being associated with a particular user, wherein each of the plurality of different types of cloud-based applications are generated based on data that is accessed from storage, and then served to the user systems, wherein the server system comprises:
        memory comprising processor-executable instructions encoded on a non-transient processor-readable media, wherein the one or more hardware processors are configurable to execute the processor-executable instructions of a session manager module that, when executed, is configurable to:
            receive session information from a session management module at each of the plurality of user systems that, when executed, is configurable to provide information about use of one or more applications at each of the plurality of user systems, wherein session information provided from each user system comprises: an activity status that indicates: which applications are in use at that particular user system, and user interaction with each application at that user system;
            maintain the session information received from each of the user systems as collective session information;
            maintain an activity log for each user system of the particular user, wherein each activity log comprises: a list of the plurality of different types of cloud-based applications at that user system that are currently being used or that have recently been used, and user interaction information for each cloud-based application of the plurality of different types of cloud-based applications;
            maintain context mapping information for each user system that maps the plurality of different types of cloud-based applications at that user system to other ones of the plurality of different types of cloud-based applications at other user systems, wherein the context mapping information for each user system comprises: an identifier for the user system; an application type and name for each of the plurality of different types of cloud-based applications that has been in use at one of the other user systems within a time threshold; and an application link to a corresponding application of that user system for each of the plurality of different types of cloudbased applications; and
            communicate, to each of the plurality of user systems, session-synchronization information,
            wherein the session-synchronization information allows for current usage of the plurality of different types of cloud-based applications at each of the user systems to be synchronized with usage of the plurality of different types of corresponding applications at other user systems when the particular user switches from using one of the plurality of user systems to using another one of the plurality of user systems, and wherein each application link is used by that user system, when that user system becomes currently active and a session context is switched to that user system, to access a corresponding application.

2. The system according to claim 1, wherein the session-synchronization information comprises:
    at least some of the collective session information.

3. The system according to claim 1, wherein the session-synchronization information is used by a particular user system to synchronize applications at that particular user system with other corresponding applications that were in use at one or more of the other user systems when that particular user system becomes active.

4. The system according to claim 1, when an indication is received that a first user system is to become active, wherein the session-synchronization information is used at the first user system to synchronize applications at the first user system with corresponding applications at other user systems that were most recently interacting with the corresponding application.

5. The system according to claim 1, wherein session information provided from each user system further comprises:
    an identifier that identifies that particular user system; and
    wherein the activity status further indicates whether that particular user system is currently in use or active.

6. The system according to claim 5, wherein session information provided from each user system further comprises:
    updates about location of that user system with respect other user systems that are associated with the particular user;
    available power or battery state of that user system; and
    network connectivity of that user system.

7. The system according to claim 1, wherein the session manager module, when executed, is further configurable to:
    determine which ones of the plurality of user systems are currently active;
    monitor for the occurrence of one or more different types of trigger events;
    communicate, to each of the plurality of user systems, the session-synchronization information when the session manager module determines that a trigger event has occurred, to force session synchronization at each of the plurality of user systems;

automatically switch session context from one of the plurality of user systems to the another one of the plurality of user systems when the particular user switches from using that one of the plurality of user systems to using the another one of the plurality of user systems, such that corresponding applications at the another one of the plurality of user systems are synchronized with one or more applications at the one of the plurality of user systems that the session context is being switched from.

8. The system according to claim 7, wherein the one or more different types of trigger events comprise one or more of:
receiving an indication that an application at one of the plurality of user systems has become active;
receiving an indication that an application at one of the plurality of user systems will become active due to occurrence of a condition; and
receiving an indication that an application at one of the plurality of user systems should become active due to occurrence of another condition.

9. The system according to claim 7, wherein the one or more different types of trigger events comprise one or more of:
usage-based trigger events; and
automatic switch-over trigger events.

10. The system according to claim 9, wherein the usage-based trigger events comprise one or more of:
receiving an indication that an application has been launched at one of the plurality of user systems was previously inactive and has become active; and
receiving an indication that there has been user interaction with an application that was previously launched at one of the plurality of user systems and has become active after a time period has passed since previous user interaction.

11. The system according to claim 9, wherein the automatic switch-over trigger events comprise one or more of: calendar-based trigger events; location-based trigger events; power-based trigger events; and network connectivity-based trigger events.

12. The system according to claim 1, wherein the user interaction information for each application of the plurality of different types of cloud-based applications includes at least information that describes a most recent interaction with the application.

13. The system according to claim 1,
wherein the context mapping information for a particular user system is used to map the plurality of different types of cloud-based applications that are in use at other user systems to the plurality of different types of corresponding applications used at that user system.

14. The system according to claim 13, wherein the context mapping information for each user system further comprises:
user interaction information for each of the plurality of different types of cloud-based applications that has been in use at one of the other user systems within the time threshold; and
wherein each application link is to a corresponding application of that user system for each of the plurality of different types of cloud-based applications has been in use at one of the other user systems within the time threshold prior to session context being switched.

15. The system according to claim 14, wherein each application link is used by the user system to access the corresponding application when the session context is switched to that user system, wherein the corresponding application is accessed in accordance with a most recent user interaction at one of the other user systems.

16. The system according to claim 14, wherein the corresponding application is not the same application that was in use at the one of the other user systems prior to the session context being switched to that user system.

17. A cloud-based application platform comprising a server system that is configured to serve a plurality of different types of cloud-based applications provided over the cloud-based application platform to each of a plurality of user systems each being associated with a particular user, wherein each of the plurality of different types of cloud-based applications are generated based on data that is accessed from storage, and then served to the user systems, wherein the server system comprises:
memory comprising processor-executable instructions encoded on a non-transient processor-readable media, wherein the one or more hardware processors are configurable to execute the processor-executable instructions of a session manager module, that when executed, is configurable to:
receive session information from a session management module at each of the plurality of user systems that, when executed, provides information about use of one or more applications at each of the plurality of user systems, wherein session information provided from each user system: indicates which applications are in use at that particular user system; and indicates user interaction with each application at that user system;
maintain the session information received from each of the user systems as collective session information;
maintain an activity log for each user system of the particular user, wherein each activity log comprises: a list of the plurality of different types of cloudbased applications at that user system that are currently being used or that have recently been used, and user interaction information for each cloud-based application of the plurality of different types of cloud-based applications;
maintain context mapping information for each user system that maps the plurality of different types of cloud-based applications at that user system to other ones of the plurality of different types of cloud-based applications at other user systems, wherein the context mapping information for each user system comprises: an identifier for the user system; an application type and name for each of the plurality of different types of cloud-based applications that has been in use at one of the other user systems within a time threshold; and an application link to a corresponding application of that user system for each of the plurality of different types of cloud-based applications; and
communicate, to each of the plurality of user systems, session-synchronization information, wherein the session-synchronization information comprises:
at least some of the collective session information that allows for current usage of the plurality of different types of cloud-based applications at each of the user systems to be synchronized with usage of the plurality of different types of corresponding applications at other user systems when the particular user switches from using one of the plurality of user systems to using another one of the plurality of user systems, wherein each application link is used by that user system, when that user system becomes currently active and a session context is switched to that user system, to access a corresponding application.

18. The server system according to claim 17, wherein session information provided from each user system further comprises: an identifier that identifies that particular user system; and an activity status that indicates whether that particular user system is currently in use or active.

19. The server system according to claim 17, wherein the session manager module, when executed, is further configurable to:
   determine which ones of the plurality of user systems are currently active;
   monitor for the occurrence of one or more different types of trigger events;
   communicate, to each of the plurality of user systems, the session-synchronization information when the session manager module determines that a trigger event has occurred, to force session synchronization at each of the plurality of user systems;
   automatically switch session context from one of the plurality of user systems to the another one of the plurality of user systems when the particular user switches from using that one of the plurality of user systems to using the another one of the plurality of user systems, such that corresponding applications at the another one of the plurality of user systems are synchronized with one or more applications at the one of the plurality of user systems that the session context is being switched from.

20. A user system associated with a particular user, comprising:
   memory comprising processor-executable instructions encoded on a non-transient processor-readable media, wherein the one or more hardware processors are configurable to execute the processor-executable instructions of a session management module, that when executed, is configurable:
      monitor a plurality of different types of cloud-based applications provided over a cloud-based application platform to the user system and each of a plurality of other user systems each being associated with the particular user, wherein each of the plurality of different types of cloud-based applications are generated based on data that is accessed from storage, and then served to the user system and the other user systems;
      generate session information about use of the plurality of different types of cloud-based applications, wherein session information: indicates which of the plurality of different types of cloud-based applications are in use at the user system; and indicates user interaction with each of plurality of different types of cloud-based applications at the user system;
      receive session-synchronization information that provides information about use of a plurality of different types of corresponding applications at each of a plurality of other user systems associated with the particular user,
      maintain an activity log for each user system of the particular user, wherein each activity log comprises: a list of the plurality of different types of cloud-based applications at that user system that are currently being used or that have recently been used, and user interaction information for each cloud-based application of the plurality of different types of cloud-based applications; and
      maintain context mapping information for each user system that maps the plurality of different types of cloud-based applications at that user system to other ones of the plurality of different types of cloud-based applications at other user systems, wherein the context mapping information for each user system comprises: an identifier for the user system; an application type and name for each of the plurality of different types of cloud-based applications that has been in use at one of the other user systems within a time threshold; and an application link to a corresponding application of that user system for each of the plurality of different types of cloud-based applications;
   wherein the session-synchronization information allows for current usage of the the plurality of different types of cloud-based applications at the user system to be synchronized with usage of the plurality of different types of corresponding applications at each of the plurality of other user systems when the particular user switches from using one of the plurality of user systems to using another user system, and wherein each application link is used by that user system, when that user system becomes currently active and a session context is switched to that user system, to access a corresponding application.

* * * * *